United States Patent

[11] 3,572,889

| [72] | Inventor | Kenneth G. Bloomfield |
| | | Rochester, N.Y. |
| [21] | Appl. No. | 817,725 |
| [22] | Filed | Apr. 21, 1969 |
| [45] | Patented | Mar. 30, 1971 |
| [73] | Assignee | Bausch & Lomb Incorporated |
| | | Rochester, N.Y. |

[54] MOUNTING AND ALIGNMENT MECHANISM FOR MICROSCOPE STAGE
8 Claims, 11 Drawing Figs.

| [52] | U.S. Cl. | 350/87 |
| [51] | Int. Cl. | G02b 21/26 |
| [50] | Field of Search | 350/84, |
| | 86—89, 90, 91; 74/(Inquired); 248/(Inquired) |

[56] References Cited
UNITED STATES PATENTS

| 1,987,776 | 1/1935 | Hauser | 350/86X |
| 2,579,195 | 12/1951 | Kurtz et al. | 350/84 |
| 2,669,158 | 2/1954 | Frischmann | 350/86 |
| 3,432,195 | 3/1969 | Jackson | 350/87X |

FOREIGN PATENTS

| 640,723 | 7/1950 | Great Britain | 350/86 |

Primary Examiner—David H. Rubin
Attorney—Frank C. Parker

ABSTRACT: A mechanism for quickly mounting and aligning any one of a variety of stages on a microscope stand in such a manner that automatic mechanical and optical alignment between the objective nosepiece and each different stage is assured.

PATENTED MAR 30 1971

KENNETH G. BLOOMFIELD
INVENTOR.

BY *Frank C. Parker*
ATTORNEY

KENNETH G. BLOOMFIELD
INVENTOR.

ATTORNEY

MOUNTING AND ALIGNMENT MECHANISM FOR MICROSCOPE STAGE

BACKGROUND OF THE INVENTION

Customarily it is the practice of the microscope designer to mount the stage of the microscope permanently or semipermanently on the stand in proper optical and mechanical alignment with its optical components and the stage is not considered to be a demountable member. In microscopes having a stationary stage and a focusable objective, the problem is somewhat simplified since the stage may be permanently adjusted and anchored using alignment keys or dowel pins. In the case of the focusable or movable stage, which is additionally required to be interchangeable with various substitute stages such as glide stage, circular stage, stage with built-in mechanical stage, stage with built-in lamphouse, stage with substage and so forth, the alignment problem is then more complicated and calls for a more sophisticated solution. However it should be understood that the present invention is also useful on microscopes having a fixed stage support and not exclusively the movable stages.

SUMMARY OF INVENTION

The present invention relates to mounting and alignment mechanism for a microscope stage and more particularly relates to the novel constructions embodied therein. In view of the problems above stated, it is an object of the present invention to provide a novel mounting and alignment mechanism for a microscope stage which is quickly demountable from the microscope and replacable by other stages.

It is another object to provide such a device which is economical to produce by ordinary manufacturing processes but which is nevertheless capable of providing good optical alignment between the axis of a substage condenser and the optical axis of a microscope established by its objective.

A further object is to provide such a device which is reliable and durable in use, is easy to service and has a pleasing appearance to buyers.

Further objects and advantages will be apparent to those skilled in the art in the combination and details of construction as described in the specification herebelow taken together with the drawings.

DESCRIPTION OF THE PREFERRED EMBODIMENT

Figure 1:
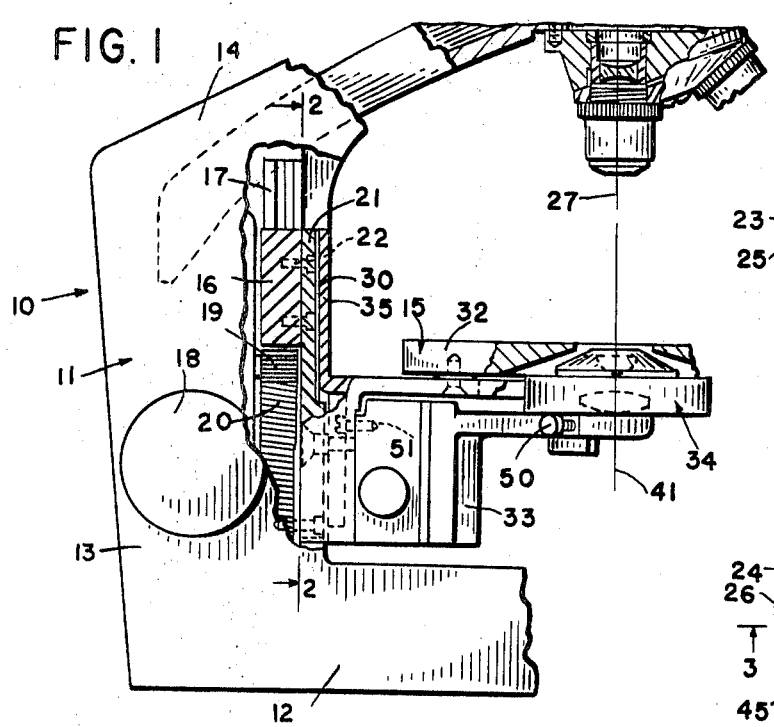
FIG. 1 is a general view of one form of the present invention in side elevation of a typical microscope partly broken away and shown in section including the pertinent operative parts thereof.

In FIG. 1 of the drawings is illustrated a general view of the preferred form of the invention wherein the entire microscope is designated by numeral 10. The microscope 10 comprises a stand or frame 11 having a base portion 12, an upright pillar portion 13, and an upper overhanging arm which is fragmentarily shown at 14.

On the front side of the pillar 13 is mounted a stage 15 which is supported preferably in a manner to be described hereinafter on a vertically movable slide member 16 which is carried on track elements 17 although member 16 may be stationary with equal adaptability to this invention. Slide member 16 is moved in the usual manner by rotating a knob 18 which actuates a pinion 19 and rack 20 connection through appropriate drive mechanism, not shown, housed in said pillar 13, said rack being fixed on said slide member.

Figure 2:
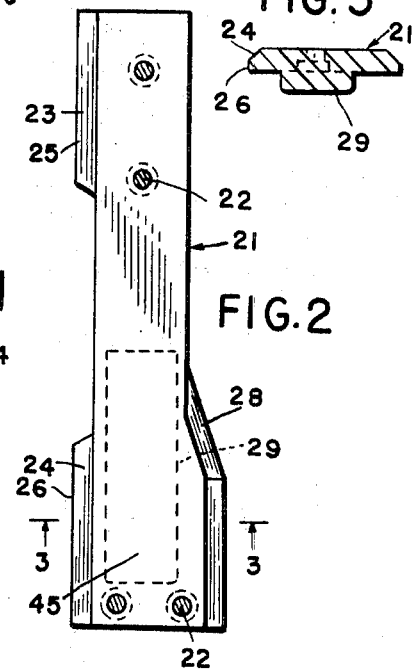
FIG. 2 is a rear elevational view of one of the coupling parts of the mounting mechanism.
Figure 3:
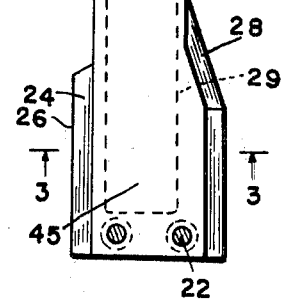
FIG. 3 is a cross-sectional view taken on the line 3–3 of FIG. 2.

According to the present invention, the mounting and alignment mechanism for the stage 15 as shown in FIG. 1 comprises an elongated mounting plate 21 which is secured on the slide member 16 by suitable screws 22 which are threaded into the slide member. Along the left side of the mounting plate 21 as viewed in FIG. 2 are formed two tandem and coplanar holding or clamping surfaces 23 and 24 which are inclined at about 45° and are indented or undercut so as to face the slide 16.

The outermost edges 25 and 26 of the abutment or clamping surfaces 23 and 24 are colinear and these edges are carefully aligned in strict parallelism with the optical axis 27 of the microscope objective as described hereinafter. This important step is most essential when it is intended that a plurality of different stages be used interchangeably.

On the side of the mounting plate 21 opposite to the clamping surfaces 23 and 24, a wedging clamping surface 28 is formed, whereon a companion part to be described is clamped. The wedging surface is positioned at a wedging angle of about 20° relative to the outer edge 26. The longitudinal location of the wedging surface 28 is somewhat above the clamping surface 24 so that upon assembly with its companion parts the lateral thrust will be transmitted in part also to the clamping surface 23 as well as the clamping surface 24. A raised boss 29 is formed longitudinally along the front side of the mounting plate 21 to add rigidity to its construction.

As mentioned heretofore, the companion parts for the mounting plate 21 are formed on the rear surface 30 of a stage support bracket 31 which supports a stage plate 32. Additionally the bracket 31 supports a substage bracket 33 wherein is adjustably held by any desired means a condenser lens 34.

Figure 4:
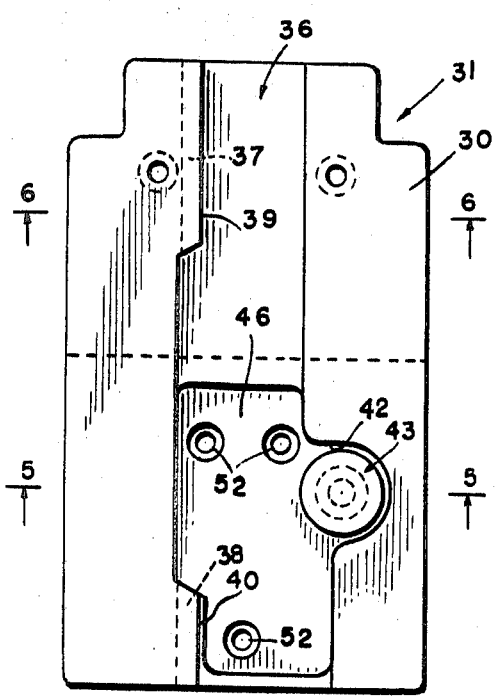
FIG. 4 is a rear elevational view of another of the coupling parts of the mounting mechanism.

With reference to FIG. 4 of the drawings, the stage support bracket 31 has an upstanding vertical wall 35 on which the flat rear surface 30 is formed. Recessed into said surface 30 is a vertical channel 36 having a pair of spaced coupling or clamping surfaces 37 and 38 formed along one side at an inclination of 45°, these surfaces being coplanar and being adapted to lie in contact with inclined surfaces 23 and 24 of the mounting plate 21. The inclined clamping surfaces 37 and 38 have colinear inside edges 39 and 40 which serve as an alignment means and are carefully aligned, as set forth hereinafter, with the optical axis 41 of the condenser lens 34.

Figure 5:
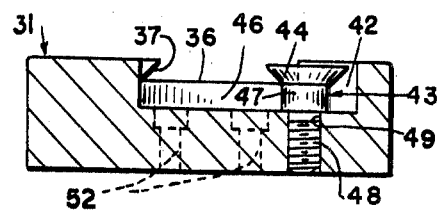
FIG. 5 is a sectional view taken on the line 5–5 of FIG. 4.

In the opposite side of the channel 36 is formed a lateral recess 42 wherein a conical clamping member 43 is located, the member as shown in FIG. 4 and FIG. 5 being in the form of a special screw whereon a conical surface or head 44 is formed at the same level as the clamping surfaces 37 and 38 and having the same inclination of 45°. The conical surface 44 cooperates with the wedgelike clamping surface 28 on the mounting plate 21 to provide a locking connection therebetween in conjunction with the engagement of the inclined clamping surfaces 23 and 24 with the corresponding clamping surfaces 37 and 38.

Figure 6:
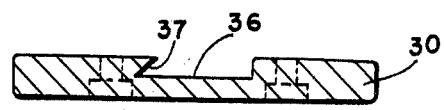
FIG. 6 is a sectional view taken on the line 6–6 of FIG. 4.

Reverting to the mounting plate 21, the transverse dimension across the lower part 45 thereof must be slightly less than the width of the channel 36 so as to permit assembly of bracket 31 on the plate 21. Furthermore, a deep longitudinal recess 46 is formed in the bottom of the channel 36 having dimensions large enough to allow the boss 29 on the plate 21 to enter upon assembly of these parts. The shape of the upper portion of the stage bracket 31 is best shown in the cross-sectional view in FIG. 6.

Although several forms of the conical clamping member 43 are disclosed herein, the form shown in FIG. 4 is provided with a cylindrical shank 47 and contiguous threaded stem 48, all being part of an integral construction. Stem 48 is threaded into a tapped hole 49 in the stage bracket 31 as best shown in FIG. 5. It will be seen in FIGS. 2 to 6 that the conical clamping member 43 functions as a quick disconnect device when disassembling the stage.

In assembling the stage 15 on the mounting plate 21 in the above-described first form of the invention, the slide member 16 is moved to its lower position on the tracks 17 and the stage bracket 31 is placed against the exposed side of the mounting plate 21 taking care to hold the lower ends of the inclined holding surfaces 37 and 38 in engageable position with respect to the upper end of the corresponding holding or abutting surfaces 23 and 24 on the mounting plate. As the bracket 31 is lowered along the mounting plate 21, the boss 29 thereon drops into the recess 46 and said plate engages in the channel 36. Downward movement of the bracket 31 stops as the conical member 43 engages the wedging surface 28 on the mounting plate 21, providing in effect a "three-point" holding mechanism which is easy to properly align.

The essence of superiority of the above-described mounting and aligning mechanism is found in its ready adaptability of the prealignment procedures whereby the stage component is accurately mechanically and optically aligned automatically upon assembly as above described.

As a preliminary step, the stage component 31 is set into an independent alignment fixture not shown, wherein optical sighting means are provided for ideally establishing an optical axis corresponding to the optical axis 27 of the microscope. A suitable target glass or reticle is provided in the location of the condenser lens 34, said reticle having locating surfaces on its mounting which correspond to that of the condenser lens.

On the first preliminary alignment fixture, the mechanical elements which hold the stage 15 correspond to the elements 23, 24 and 28 of the mounting plate 21 so that true interchangeability is established. With the stage 15 positioned on the fixture, the aforesaid optical sighting means of any useful design are used to view the alignment reticle and by turning the two or more adjusting thumbscrews 50 the final setting of said screws is established which positions the condenser lens 34 correctly upon assembly of the stage.

In the first alignment fixture, access space is provided to permit adjustment of the holding screws 51 shown in FIG. 1 which are used in the counterbored holes 52 which are shown in FIGS. 4 and 5. Screws 51 are at first only tentatively tightened in oversized holes following which the inside edges 39 and 40 of the holding surfaces 37 and 38 are carefully aligned with the optical axis 41 of the condenser lens 34. Then screws 51 are firmly and finally tightened.

A second preliminary alignment fixture is provided for finally adjusting the mounting plate 21 so that its colinear outer edges 25 and 26 are accurately aligned with the optical axis 27 of the objective of the microscope. Optical sighting means of any useful design are used for viewing when said outer edges 25 and 26 are in good optical alignment with the optical axis 27 of the objective. At first the holding screws 22 for the mounting plate 21 are only tentatively tightened, following which the edges 25 and 26 are accurately aligned with the objective optical axis 27 and then the screws are firmly and finally tightened.

Therefore because of the novel construction of the stage mounting it is possible as described above to independently align all of the various demountable stages at the factory, all stages being interchangeable and automatically prealigned.

DESCRIPTION OF SECOND FORM OF INVENTION

Figure 7:
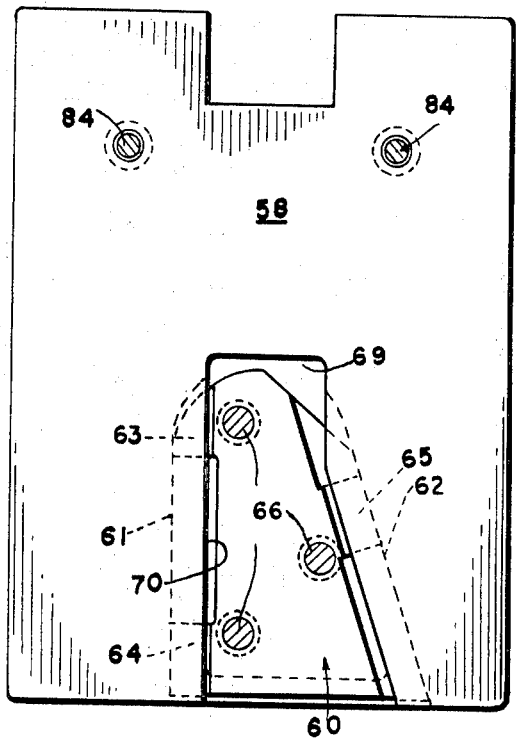
FIG. 7 is a rear elevational view partly in section taken on the line 7–7 of FIG. 8 showing a second form of the invention.
Figure 8:
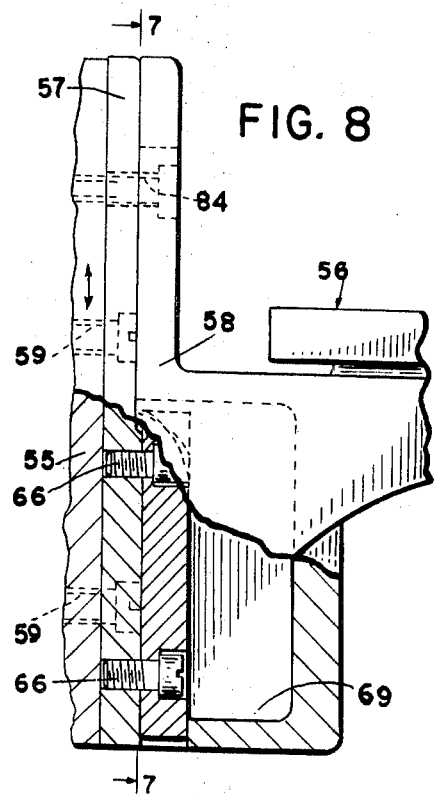
FIG. 8 is a side elevational view partly in section and broken away of the mechanism shown in FIG. 7.
Figure 9:
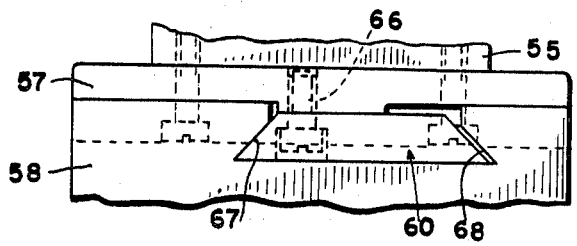
FIG. 9 is a bottom view with parts broken away of the mechanism shown in FIG. 7.

In the second form of the invention, the mounting mechanism is constructed differently with respect to the interengaging wedging parts as shown in FIGS. 7, 8 and 9. FIG. 8 fragmentarily shows one side of a stage supporting slide 55 whereon a stage 56 is mounted by means of a mounting plate 57 to which is demountably attached a stage bracket 58. During the assembly and aligning operations, the mounting plate 57 is held on the stage support slide 55 by a plurality of screws, two of which are shown in dotted lines at 59, said slide being movable vertically as indicated by the double-ended arrow placed thereon.

To connect the mounting plate 57 to the stage bracket 58 a wedge member 60 is employed having two angularly spaced sides, one being a vertical surface 61 and the other being an obliquely formed surface 62. Both of the surfaces 61 and 62 are inclined or beveled at 45° so as to face the mounting plate 57, and on the top and bottom portions of the vertical surface 61 are formed smooth and coplanar contact pads 63 and 64 respectively at the same angle of 45°. On the oblique surface 62, another smooth contact pad 65 is formed at 45° about opposite the midpoint between the contact pads 63 and 64. Said wedge member 60 is secured onto the mounting plate 57 preferably by means of three countersunk screws 66 which are seated as shown in FIG. 8 in said member and are firmly threaded into the plate 57.

As best shown in FIGS. 7 and 9 complementary clamping surfaces 67 and 68 are formed at the same wedging angle to each other as the dovetailed surfaces 63, 64 and 65. In this way a three-point support is provided between the plate 57 and bracket 58. When assembled, the wedge-type connecting parts are all concealed.

With regard to the alignment procedure for the second form of the invention, it follows closely the procedure above described for the first form of the invention and therefore the wedge holding screws 66 are not firmly set until after the vertical side 61 of the wedge member 60 is accurately aligned with the optical axis of the condenser lens. Likewise the holding screws 59 are not firmly screwed into the movable slide 55 until after the vertical edge 70 of the recess 69 is accurately aligned with the optical axis of the microscope objective.

Figure 10:
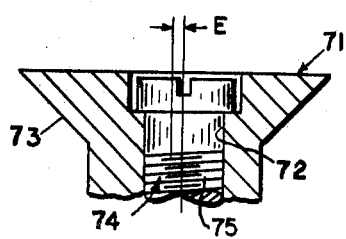
FIG. 10 is a midsectional view of one of the locking parts shown in FIG. 4.

A modification of the conical clamping member shown at 43 in FIG. 4 is illustrated in FIG. 10 of the drawing, the modified member being numbered 71. The principal difference between conical member 43 and conical clamping member 71 is that the latter is adjustable laterally to control operating clearances between the respective clamping surfaces selectively. This result is achieved by providing a pivot hole 72 in member 71 eccentric to its conical surface 73 by a dimension denoted E. The pivot hole 72 is counterbored as shown in FIG. 10 and a flat headed clamping screw 74 is seated therein, the head having a threaded shank 75 formed thereon which is threaded into a suitable tapped hole in the bracket 31.

Adjustment of the operating clearances between the clamping surfaces is obtained by rotating the eccentric head of the member 71 by any desired means such as a spanner wrench or screwdriver not shown.

Figure 11:
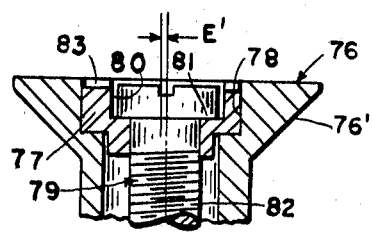
FIG. 11 is a view similar to FIG. 10 showing a modification thereof.

Another modification of a conical clamping member is designated generally by numeral 76 in FIG. 11 whereon the conical and eccentrically mounted clamping surface 76' is provided. In order to obtain the necessary transverse adjustment of the conical surface 76', an eccentric sleeve 77 is fitted into a countersunk cylindrical surface 78 which is eccentric to a clamping bolt 79 by an amount which is designated E'. A counterbore 80 is formed in the sleeve 77 eccentric to its outer diameter, said counterbore having a shoulder 81 against which the head of the bolt 79 is drawn by a thread 82 similar to the bolt 43 of FIG. 5. Radial gashes or castellations 83 are provided in the top surface of the eccentric sleeve 77 by which it may be rotated by a properly fitting tool to vary the eccentricity E'.

After aligning operations are completed, a lock screw or screws 84 may be drilled through plate 57 and bracket 58 as shown in FIGS. 7 and 8 to stabilize the adjustment if desired.

It will be perceived in the foregoing description that there is here provided a novel mounting and aligning mechanism for demountable stages used on microscopes, the mechanism having means for closely and accurately aligning the principal components of the microscope optically and mechanically with the clamping parts of the mechanism and its supporting parts, superiority over the prior art being achieved in the facility of use and service of the microscope and the reliability of the demountable connecting parts.

Although only certain forms of the present invention and modifications thereof are here described and illustrated in the accompanying drawings, other forms, arrangements and modifications are possible within the purview of said invention, reference being had to the claims herebelow for a definition of the scope thereof.

I claim:

1. Mounting and alignment mechanism for a microscope stage comprising:
   a microscope base;
   a movable stage carrying slide mounted upon said microscope base;
   an elongated mounting plate;
   a first pair of spaced inclined and coplanar abutment surfaces formed along one side of said plate near the ends thereof, the outer exposed edges of said surfaces being colinear with each other and being alignable parallel with the optical axis of the objective of the microscope, adjustable means for fixing said plate on said slide in parallel alignment with said axis;
   a stage support bracket whereon a wall is formed extending contiguously parallel to and substantially coextensive with said plate;
   a second pair of spaced and coplanar abutment surfaces which are formed in said bracket complementary to the first said abutment surfaces and which are inclined to lie against said first pair of abutment surfaces when the bracket is assembled on the plate, the second pair of abutment surfaces having corresponding side edges which are colinear and which are alignable parallel with an optical axis which extends through an optical condenser carried by said bracket; and
   interlocking holding surfaces formed in cooperatively laterally spaced position from the first and second pair of abutment surfaces on the plate and bracket, at least one of the holding surfaces being positioned at a vertically converging wedging angle to said first and second pair of abutment surfaces.

2. A mounting and alignment mechanism for a microscope stage as set forth in claim 1 further characterized by the other of said holding surfaces being conically formed on a member which is fixed on the stage bracket in operative engagement with the wedging surface.

3. A mounting and alignment mechanism for a microscope stage as set forth in claim 2 further characterized by:
   the conically formed member having a flat lateral clamping surface on which it rests;
   a smooth cylindrical surface defining a bore extending through said member parallel to the axis of the conically formed surface and eccentrically offset therefrom; and
   a clamping bolt slidably fitted into said bore and threaded into said bracket to provide a clamping fit between the inclined clamping surfaces and the opposite conically surfaced clamping member.

4. A mounting and alignment mechanism for a microscope stage as set forth in claim 2 further characterized by:
   the conically formed member having a flat lateral clamping surface which intersects the smaller diameter of the conical surface and whereon the member rests;
   a bore and a contiguous shouldered counterbore extending through the conical member and being eccentric to said conical surface;
   a counterbored sleeve member slidably fitted within said bore and counterbore, said sleeve member having an inner cylindrical surface formed eccentrically therethrough defining an inner bore;
   means for rotating said sleeve member in the counterbore; and
   a clamping bolt fitted to said inner surface and having a head which is seated in the counterbore of said member and threaded into said bracket to clamp the conical member in a proper lateral operating position.

5. Mounting and alignment mechanism for a microscope stage comprising:
   a stage carrying slide mounted for vertical movement on said microscope;
   a mounting plate secured adjustably to said slide;
   a wedge shaped support member secured adjustably to said plate with the widest portion of the wedge lowermost;
   two dovetail shaped inclined surfaces formed along the convergent sides of said support member, one of which is vertical and is aligned parallel with the optical axis of the objective of the microscope by adjustment of said mounting plate with respect to said slide;
   a stage support bracket and a condenser lens member adjustably carried thereon, said bracket having a vertical rear wall;
   a pair of convergent holding surfaces which are formed complementary to said dovetail shaped surfaces and lying in contact therewith, said surfaces forming two boundaries of a convergent opening in said bracket and one of said surfaces being vertical and being aligned parallel with the optical axis of said condenser member; and
   whereby assembly of the stage on the microscope is effected by engagement of the two pairs of convergent surfaces and optical alignment of the condenser member with the optical axis of said objective is simultaneously affected.

6. Apparatus for mounting and demounting interchangeable members of a microscope and for aligning said members to an optical axis thereof, comprising:
   a. a base;
   b. adjustment means on said base for driving a movable slide member of said microscope along said optical axis;
   c. a first vertical plate;
   d. adjustable connecting means connecting said first vertical plate to said movable slide member for aligning an edge of said first vertical plate parallel with said optical axis;
   e. a second vertical plate demountably interlocked with said first vertical plate and having means for laterally urging an edge of said second vertical plate against said aligned edge of said first vertical plate for aligning said edge of said second vertical plate parallel with said optical axis, said means for urging an edge of said second vertical plate against said aligned edge of said first vertical plate comprising an inclined member on one of said vertical plates engageable with a protrusion of the other of said vertical plates; and
   f. adjustable connecting means connecting one of said interchangeable members to said second vertical plate for aligning such member with said optical axis.

7. The apparatus of claim 6 wherein said first and second vertical plates are dovetailed to one another.

8. The apparatus of claim 7 wherein said aligning edge of said first vertical plate comprises two colinear portions disposed respectively above and below a point at which said urging means is engaged.